United States Patent [19]

Griffin

[11] Patent Number: 4,785,227
[45] Date of Patent: Nov. 15, 1988

[54] MOBILE EMERGENCY MEDICAL VEHICLE

[75] Inventor: John Griffin, Houston, Tex.

[73] Assignee: Frazer, Inc., Houston, Tex.

[21] Appl. No.: 7,599

[22] Filed: Jan. 28, 1987

Related U.S. Application Data

[62] Division of Ser. No. 816,390, Jan. 6, 1986, Pat. No. 4,672,296.

[51] Int. Cl.⁴ .............................................. B60P 3/00
[52] U.S. Cl. ......................................... 322/1; 62/244;
290/4 R; 307/10 R; 307/84; 315/78
[58] Field of Search ................... 322/1, 90; 320/15, 6,
320/61, 62; 307/9, 10 R, 10 LS, 66, 84; 315/78;
290/4 R, 4 A; 62/243, 244

[56] References Cited

U.S. PATENT DOCUMENTS

| | | | |
|---|---|---|---|
| 4,106,582 | 8/1978 | DeBella | 322/1 X |
| 4,262,212 | 4/1981 | Jacob et al. | 307/9 |
| 4,347,473 | 8/1982 | Stroud | 307/84 X |
| 4,352,991 | 10/1982 | Kaufman | 307/9 |
| 4,531,379 | 7/1985 | Diefenthaler, Jr. | 62/243 X |

Primary Examiner—Patrick R. Salce
Assistant Examiner—Anita M. Ault
Attorney, Agent, or Firm—Hubbard, Thurman, Turner & Tucker

[57] ABSTRACT

This invention relates to a mobile emergency medical vehicle having a main transport engine and a medical equipment, supply and patient compartment or module, with such compartment having an independently operated electrical generating means powered by an auxiliary engine capable of providing all of the electrical power requirements of the compartment including exterior and interior electrical lighting, vacuum generating means, power outlet means, compartment air conditioning, heating and the like. The electrical generating means is capable of supplying both 115 volt AC and 12 volt DC power through a converter to the compartment. Switching means is provided to facilitate switching at least a portion of the 12 volt DC power requirements of the patient compartment including exterior and interior lighting and vacuum generating means to the electrical system of the main transport engine upon failure of the compartment electrical generating means or auxiliary engine for any reason. The vehicle provides greater electrical capacity and reliability for mobile medical equipment and support systems to a self-sustaining patient compartment for ease of maintenance and servicing and resulting fail-safe operation.

12 Claims, 2 Drawing Sheets

MOBILE EMERGENCY MEDICAL VEHICLE

This is a division of application Ser. No. 816.390 filed Jan. 6, 1986 now U.S. Pat. No. 4,672,296.

BACKGROUND OF THE INVENTION

1. Field of the Invention

This invention relates to an improved mobile emergency medical vehicle or ambulance for over-the-road service in handling medical emergencies with greater reliability and lesser maintenance to ensure proper performance in all situations, the vehicle having a medical equipment, supply and patient module with self-supporting integral electrical generating capability to supply all electrical requirements of the module with electrical back-up being provided by the main transport engine of the vehicle.

2. Description of the Prior Art

Previously in the manufacture of virtually all ambulances of the Type I style for over-the-road emergency medical service, a truck chassis as manufactured by a truck manufacturer has been utilized having the maximum electrical generating capacity driven by the main transport engine of the truck to supply the electrical and medical equipment requirements of the patient compartment along with the operator's compartment of the vehicle. In such cases all of the electrical requirements of the patient module, including exterior and interior lighting as well as air conditioning and heating needs of the module, have all been driven from or provided by the main truck engine requiring substantial interconnection between the main engine and the patient module. As the electrical requirements of the module have continually increased over the years and truck manufacturers have indicated the problems to be anticipated with overloading various components of the main truck engine, presently existing ambulances have required very substantial maintenance and servicing to ensure that the main truck engine is capable of meeting all of the various requirements of the patient module at all times whether the ambulance be in service or on standby duty. The typical truck chassis utilized for ambulance manufacturing has involved a maximum size electrical alternator and dual batteries, one of which provides starting power for the transport engine and the other of which provides auxiliary power for the module electrical needs. Air conditioning and heating requirements of the module have been taken from the main truck engine which has not always been satisfactory in view of the extensive modifications required to the engine components to bring both air conditioning and heating capability into the module from the transport engine.

In existing mobile emergency medical vehicles of Type I as defined by federal specifications, it is not uncommon for the main truck engine to be operated in an advanced idling condition at the scene of a medical mission in order to supply all of the electrical requirements of the vehicle and patient module. Thus, the total number of miles traveled on medical missions by such vehicle is not a true indication of the condition of the vehicle for continuing and repeated medical missions. In many such vehicles it is necessary to monitor the total running time of the engine, especially under high idling conditions to determine whether the vehicle is fully capable of performing such missions on a regular repeated basis. In warm climates the air conditioning unit driven by the main truck engine is in some cases incapable of providing adequate air conditioning to the patient module and all of the electrical requirements of such module are dependent upon the electrical generating system of the main truck engine.

Proper maintenance of emergency medical vehicles such as ambulances has been an increasing concern of the industry, especially in situations where a given vehicle may be required to perform 300–350 medical missions per month under widely varying conditions and for widely varying time periods. As the electrical requirements for the patient compartment have increased, the industry has been unable to significantly increase the onboard capability for providing all of the electrical needs of the module, being limited by the performance capability of the transport engine and its electrical generating and storage capacity. The onboard electrically-powered medical equipment has basically been limited heretofore to the 12 volt DC system supplied by the truck electrical system which has been adequate in some cases for powering electrical equipment such as improved vacuum generating pumps and the like during transport. There is an increasing need to supply both 115 volt AC as well as 12 volt DC power within the patient module to provide a much greater capability in powering newer and improved types of medical equipment. With many types of currently manufactured ambulances equipped with heavy-duty 165 ampere alternators, for example, the main truck engine must be operated at relatively high speeds, especially while standing, to meet the air conditioning and medical equipment needs of the module as well as other electrical needs such as both interior and exterior electrical lighting, sirens, flood lights, and the like.

It is highly desirable that the medical module mounted on the truck chassis be as largely self-supporting as possible to facilitate remounting of the module on a separate truck chassis with minimum modifications being required. With the module being substantially self-supporting in all its electrical requirements, the module may be more readily monitored independently of the vehicle to simplify record keeping, maintenance and servicing to ensure essentially fail-safe performance of all components of the module under widely varying conditions and service requirements.

In the situation where many modern-day ambulances having patient modules entirely dependent upon the main truck engine for its electrical requirements, as stated, the main engine must be continuously operated at the site of the medical mission to supply the electrical requirements and the main transport engine is rarely turned off to ensure that the electrical storage capacity is not unduly drained and the vehicle may subsequently refuse to start when desired. If turned off, there is real concern that the main engine may not restart due to heavy electrical loading when standing.

Within the ambulance industry it is well understood that the truck manufacturers' recommended service programs for the vehicle per se are inadequate in determining the high performance requirements of ambulance and paramedic systems. Further, in the larger cities there has been an attempt to standardize the ambulance fleets which are both privately and publicly owned to simplify maintenance and replacement part servicing of the ambulance units which are ready for use and on standby to cover existing needs as well as greater peak loads that might be anticipated at any given time. Such maintenance and servicing can be extremely costly and time consuming to ensure that all units are available for all assigned medical missions.

The desirability of separating the main engine which transports the vehicle from the electrical needs of the medical module has been a continuing problem for the industry until the problems associated therewith have been solved by the present invention.

SUMMARY OF THE INVENTION

This invention provides a mobile emergency medical vehicle which utilizes an auxiliary engine separated from the main transport engine for providing all of the electrical needs of the medical module. The auxiliary engine drives electrical generating means to supply both 115 volt AC and through a converter 12 volt DC power to the module for both exterior emergency lighting as well as interior lighting to the compartment, and essentially all of the emergency indicating means required of the vehicle to designate its traveling on a medical mission. The electrical generating means supplies both air conditioning and heating to the module as well as power for various types of medical equipment such as vacuum pumps for patient use and electrical outlets within the module for powering other types of medical and auxiliary equipment. The electrical generating means is capable of supplying both main DC power and auxiliary DC power to the vehicle module as well as both both AC and DC electrical outlet receptacles. Switching means is provided upon interruption of the module electrical generating means so that at least a portion of the 12 volt DC power requirements of the module such as reduced exterior and interior electrical lighting may be maintained in continuous operation, such back-up power being supplied by the electrical generating system of the main transport engine. Vacuum generating means and additional electrically-powered medical equipment for use in attending patients can be continuously maintained in operable condition within the module by one or the other of the electrical sources.

DESCRIPTION OF THE PPEFERRED EMBODIMENTS

The emergency medical vehicle of the present invention designated by the numeral 10 is built on a conventional truck chassis having the main transport engine located beneath the hood as well known in the art. The patient module 11 is mounted on the rearward portion of the truck chassis as well known in the art. However, in accordance with the present invention the module is essentially self-supporting with regard to its electrical requirements. As is conventional in the case of the truck chassis which is conventionally used in constructing Type I ambulances, the transport engine is equipped with a heavy-duty alternator and dual electrical storage batteries which are mounted under the hood. One battery serves to start the transport engine and the other battery serves to provide auxiliary power to the vehicle. Previously, in known types of ambulances, the second battery serves to power the auxiliary equipment including the emergency vehicle lighting and interior lighting of the patient module. In accordance with this invention the auxiliary battery mounted adjacent the main truck engine serves only to supply a back-up portion of the electrical needs to the module in the event its self-contained electrical generating capacity is unable to satisfy the electrical requirements of the module.

Figure 1:
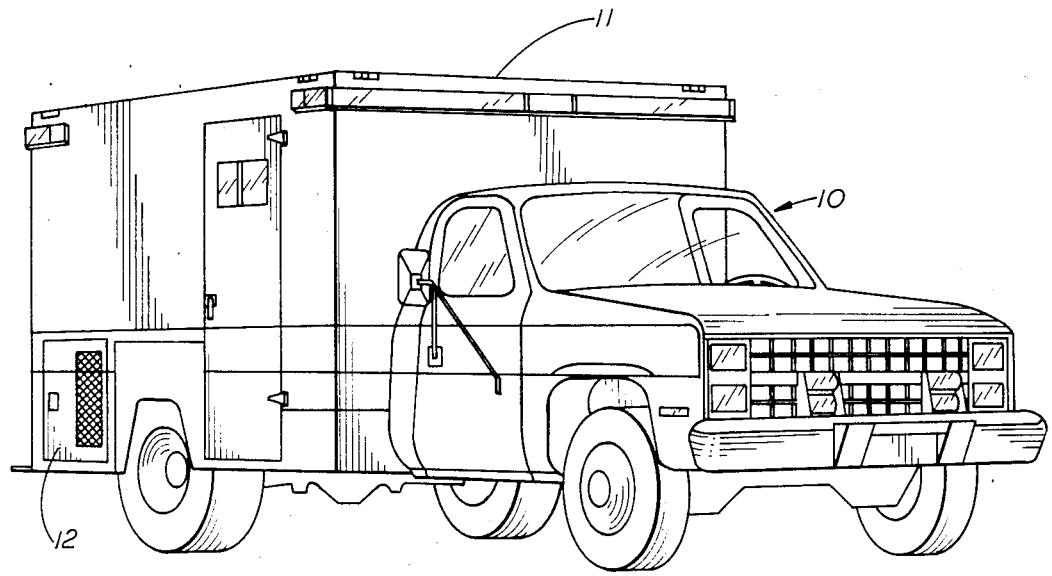
FIG. 1 is a perspective view of a mobile emergency medical vehicle constructed in accordance with the present invention.
Figure 2:
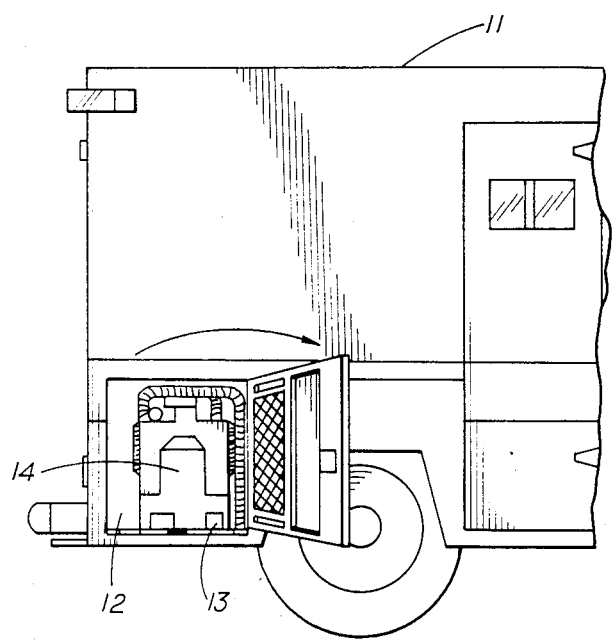
FIG. 2 is a fragmentary side elevational view of the vehicle shown in FIG. 1 illustrating the mounting of the auxiliary engine and electrical generating means in a lower separate compartment of the vehicle.

As shown in FIGS. 1 and 2, a separate lower compartment 12 of the module is utilized to mount an auxiliary engine and an electrical generator powered by such engine in such compartment. A preferred type of generator power source is one of the so-called "gen sets" of the Onan Corporation which are designed for under-floor mounting in an individual compartment adjacent a rearward portion of the truck chassis. A preferred type of such generator is one capable of producing 4000 watts of power at 120 volts AC, 33.3 amperes, 60 hertz, in single-phase output on a two-wire system. The generator is preferably powered by a four-cycle, two-cylinder horizontally opposed engine which is capable of being started by a 12 volt battery preferably the starting battery of the truck main engine. The generator may also be one capable of supplying 6000 watts where greater capacity is needed.

The auxiliary engine and generator 14 are preferably combinedly mounted on a skid-type mounting frame 13 fitted within the compartment 12 for ready slide-out removal of the unit for servicing and inspection. The auxiliary engine and generator are mounted exteriorly of the patient module so that its exhaust system extends outwardly and delivers minimal noise and vibration to the patient module.

Figure 3:
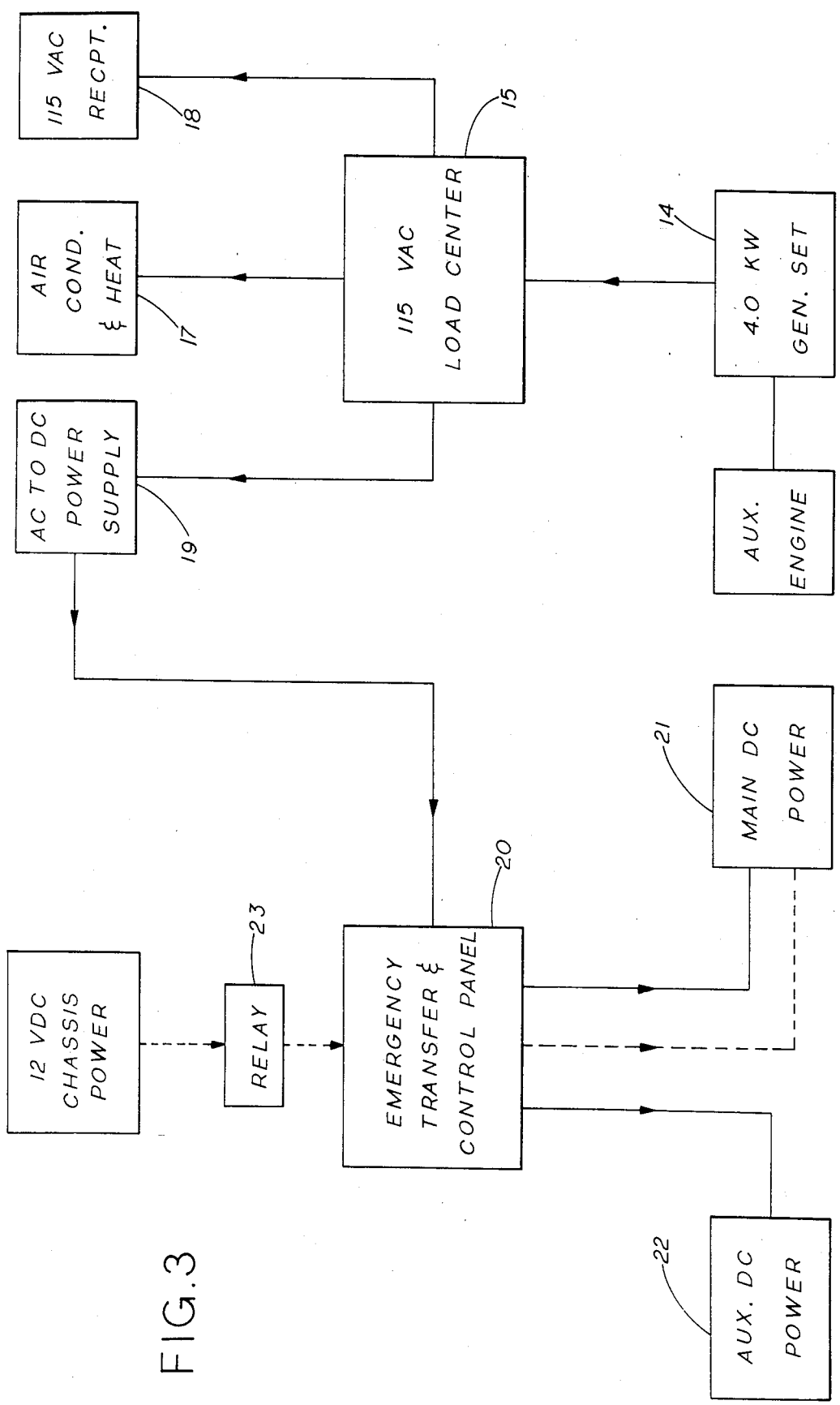
FIG. 3 is a schematic electrical diagram illustrating the electrical circuitry of the vehicle of the present invention.

The electrical output of the generator preferably power is capable of continuously delivering 115 capable of providing 4.0 to 6.0 kilowatts of continuous electrical volt AC power to the electrical load center of the module designated by the numeral 15 on FIG. 3. The load center provides distribution of the primary output of the generator 14 to air conditioning and heating means designated by the numeral 17 which are capable of supplying both cooling and heating to the patient module. The module is preferably insulated to minimize temperature fluctuations within the module and to facilitate most efficient cooling or heating as desired. The generator which is preferably located on the passenger side at a rear lower corner of the vehicle provides module power for emergency lights, air conditioning, heating, suction, interior lights, and the like. The air conditioner is electrically operated on 115 volt AC power and has its condensor mounted in a separate lower compartment beneath the module for dispelling heat to the exterior when operated in its cooling mode. The electrical heater consists of 115 volt AC strip heaters which are mounted in spaced locations within the module to supply heating as desired. The load center 15 also supplies a plurality of 115 volt AC receptacles 17 within the module to permit plugging in a wide variety of medical equipment, including newer types of vacuum pumps, requiring such electrical power. The load center 15 also contains an AC to DC electrical converter 19 which converts a portion of the generator output to the 12 volt DC power normally required by both the exterior and interior lighting of the vehicle. The DC power supply is wired to deliver such 12 volt DC power to an emergency transfer and control panel located within the module, such panel being designated by the numeral 20. The panel is capable of supplying main DC power designated by the numeral 21 to the module which includes the minimal exterior lighting required to designate the vehicle as an ambulance and powers both front and rear beacons, sirens, flashers, and lighting strips on the vehicle. The electrical converter 17 preferably consists of an 85 ampere AC to DC power supply to provide 12 volt DC lighting to the emergency indicating lights and interior 12 volt DC fluorescent lights within the module. All such exterior lighting is in accordance with federal specifications for Type I ambulances as set forth in federal specification No. KKK-A-1822B dated June 1, 1985. The control panel 20 also supplies auxiliary 12 volt DC power designated by the numeral 22 to the vehicle for energizing strobe lights, and controls load lights, door warning lights, step lights, and auxiliary dome lights. All electrical circuits within the module are wired in accordance with National Electrical Code specifications and are normally recessed inside the module and ceiling or mounted exteriorly of the walls in surface conduit. The electrical circuits, relays, breakers, and terminal strips are located in a metallic enclosure accessible from within the module with individual controls located on the outer surface of the panel for individual control.

The module interior is also equipped with vacuum generating equipment which may be wired directly into the 12 volt DC circuit or be capable of plugging into such electrical outlets provided interiorly. The vacuum is normally provided by a vacuum pump powered by such 12 volt DC power although it may also consist of a suction unit which may be plugged into the 115 volt AC receptacles 13 within the module.

The module is wired with electrical interconnection between the emergency transfer and control panel 20 and the auxiliary battery associated with the transport engine of the vehicle. An automatic relay 23 is adapted to be operated upon failure of the electrical generator of the module or its auxiliary engine, such that discontinuance of the 12 volt DC lighting and vacuum pump power might result. In the event of failure of such module electrical power the relay 23 automatically switches the main 12 volt DC power requirements of the module including at least a portion of the exterior and interior lighting of the module and the vacuum pump requirements to the auxiliary battery of the vehicle. Such switching of the power source from the module to the electrical charge storage system of the vehicle provides backup power to the essential elements of the vehicle which must be maintained in continuous operation during a medical mission. Only a portion of the DC power requirements of the module are energized by the vehicle auxiliary battery or main engine alternator such as approximately one-half of the normal current load which permits continuous operation of the essential medical equipment and emergency indicating lighting elements of the vehicle.

The utilization of the emergency transfer relay is designed to automatically transfer at least a portion of the essential 12 volt DC systems such as front and rear beacons, four or more interior fluorescent lights, vacuum pump, and the like, to the chassis DC alternator or battery in the event of a generator failure or interruption in its power supply. The emergency transfer relay is a double pole, double throw type such as Model No. PRD 11D40, manufactured by Potter & Brumfield Company. Such relay has reinforced screw terminals and a plastic enclosure around the coil being UL and CSA listed. The use of a double pole, double throw relay allows the ampacity to be distributed between two sets of contacts allowing about 40 percent longer service life to the relay.

The onboard electrical generating capability of the module permits discontinuance of operation of the main transport engine when standing at the site of a medical mission or when servicing or inspecting the module for proper performance. The main truck engine may be either gasoline or diesel powered without having any effect on operation of the module and the auxiliary engine of the module may also be either gasoline or diesel operated as desired or required. Obviously greater or lesser electrical generating capacity may be utilized for supporting the electrical requirements of the module; however, the 4.0 kilowatt generator referenced above has been found to provide adequate electrical capacity for Type I ambulances.

The module may be readily remounted onto a second truck chassis with the only interconnection being the electrical line from the truck main engine electrical system. The module may be serviced by operating its generator and checking its electrical systems and/or operating its cooling or heating systems during such servicing. Obviously, a by-pass can be provided to furnish 115 volt AC power to the module from a supplemental source during servicing without operating the module generator. The main fuel tank of the vehicle is used to supply both main and auxiliary engines where they have similar fuel requirements.

Various modifications may be resorted to within the spirit and scope of the appended claims.

What is claimed and desired to be secured by Letters Patent is:

1. A mobile emergency medical vehicle having a medical equipment, supply and patient module comprising:

first motor means for transport of the said vehicle,
second motor means mounted adjacent the medical equipment, supply and patient module and operable independently from said first motor means,
electrical generating means associated with said second motor means capable of generating 115 volt AC and 12 volt DC through a converter for powering the electrical requirements of said module,
electrical charge storage means associated with said first motor means for initiating operation of said first and second motor means each independently of the other,
exterior and interior electrical lighting means powered by said electric generating means associated with said second motor means adapted to provide exterior emergency vehicle indicating means and interior electrical lighting means within said module,
electrical outlet means located within said module powered by said electrical generating means,
air-conditioning means and heating means for controlling the temperature within said module powered by said electrical generating means, and
switching means for switching at least a portion of said exterior and interior electrical lighting means from said electrical generating means associated with said second motor means upon failure thereof to said electrical charge storage means associated with said first motor means to maintain continuous operation of said lighting means.

2. A mobile emergency medical vehicle in accordance with claim 1, including vacuum generating means located within said module powered by said electrical generating means associated with said second motor means.

3. A mobile emergency medical vehicle in accordance with claim 2, wherein the said electrical generating means provides both 115 volt AC power to energize electrical outlet means, air conditioning means and heating means within said module, and through a converter 12 volt DC power to energize exterior emergency vehicle indicating means, interior electrical lighting means and vacuum generating means within said module.

4. A mobile emergency medical vehicle in accordance with claim 1, including vacuum generating means located within said module powered by 12 volt DC power through a converter delivered by said electrical generating means, said switching means adapted to automatically switch the power requirements of said vacuum generating means to said electrical charge storage means upon interruption in output of said electrical generating means.

5. A mobile emergency medical vehicle in accordance with claim 1, wherein said electrical generating means is capable of delivering 115 volt AC power to energize the said air conditioning means, heating means and electrical outlet means within said module and 12 volt DC power through a converter to energize the said exterior and interior electrical lighting means associated with said module, said 12 volt DC power being backed up by the said electrical charge storage means associated with said first motor means.

6. A mobile emergency medical vehicle in accordance with claim 1, wherein said second motor means and said electrical generating means unit are combinedly mounted on a skid-type mounting unit in a separate lower compartment of said module.

7. A mobile emergency medical vehicle in accordance with claim 1, wherein said module is self-supporting with regard to its electrical power requirements, said switching means providing back-up power from said electrical storage means associated with said first motor means upon interruption in output of said electrical generating means associated with said second motor means.

8. A mobile emergency medical vehicle in accordance with claim 1, including an electrical converter to convert a portion of the 115 volt AC power generated by said electrical generating means to 12 volt DC power to energize essentially all of the exterior emergency indicating lighting and module interior lighting requirements of said vehicle.

9. A mobile emergency medical vehicle in accordance with claim 1, wherein said module contains its own electrical power requirements provided by said electrical generating means associated with said motor means.

10. A mobile emergency medical vehicle in accordance with claim 1, wherein said second motor means and said electrical generating means are operable fully independently of said first motor means to provide both 115 volt AC and 12 volt DC power through a converter to said module to satisfy its electrical requirements.

11. A mobile emergency medical vehicle in accordance with claim 1, wherein said air-conditioning means comprises an evaporator unit located within said module and a condensor unit located exteriorly in a lower region of said module, said air-conditioning means being powered by 115 volt AC power.

12. A mobile emergency medical vehicle having a medical equipment, supply and patient module comprising:

first motor means for transport of the said vehicle;
second motor means mounted adjacent the medical equipment, supply and patient module and operable independently from the first motor means;
electrical generating means associated with said second motor means capable of generating 115 volt AC and 12 volt DC through a converter for powering the electrical requirements of said module;
electrical charge storage means associated with said first motor means for initiating operation of said first and second motor means each independently of the other;
exterior and interior electrical lighting means powered by said electric generating means associated with said second motor means adapted to provide exterior emergency vehicle indicating means and interior electrical lighting means within said module;
electrical outlet means located within said module powered by said electrical generating means;
air-conditioning means and heating means for controlling the temperature within said module powered by said electrical generating means;
switching means for switching at least a portion of said exterior and interior electrical lighting means from said electrical generating means associated with said second motor means upon failure thereof to said electrical charge storage means associated with said first motor means to maintain continuous operation of said lighting means; and
vacuum generating means located within said module powered by said electrical generating means associated with said second motor means, said switching means comprising an automatic relay adapted to switch a portion of said exterior and interior electrical lighting means and said vacuum generating means of said module from said electrical generating means associated with said second motor means upon failure thereof said electrical charge storage means associated with said first motor means to maintain said lighting and vacuum means continuously energized.

* * * * *

Disclaimer 4,785,227 - John Griffin, Houston, Texas. MOBILE EMERGENCY MEDICAL VEHICLE. Patent dated Nov. 15, 1988. Disclaimer filed Oct. 26, 1999, by the assignee, Frazer, Inc.

The term of this patent subsequent to July 22, 1992 has been disclaimed.

*(Official Gazette, December 28, 1999)*